Patented Aug. 31, 1948

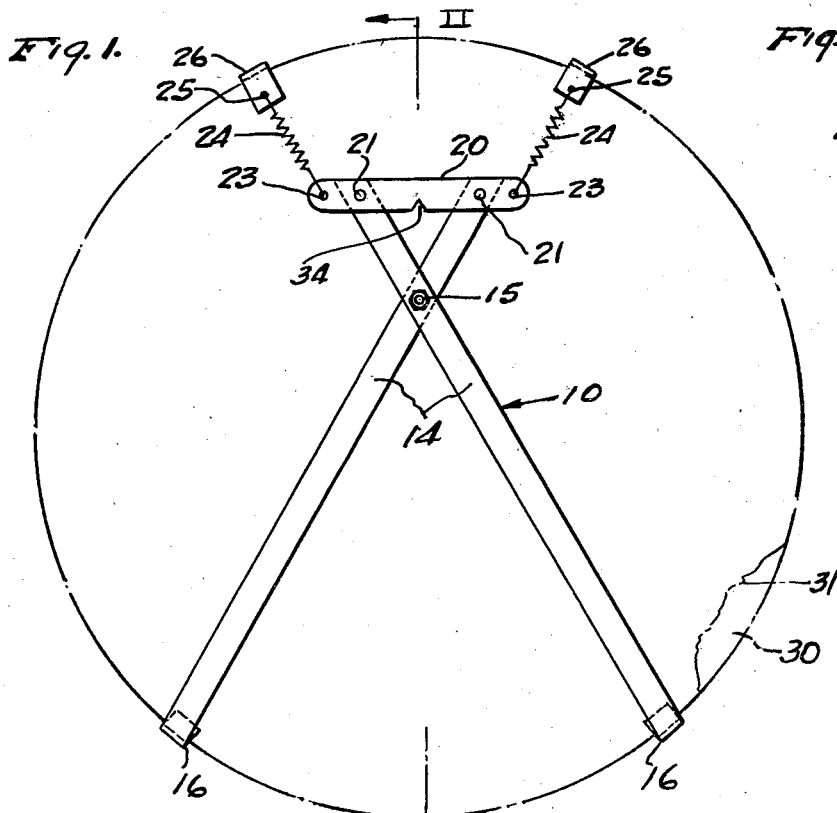
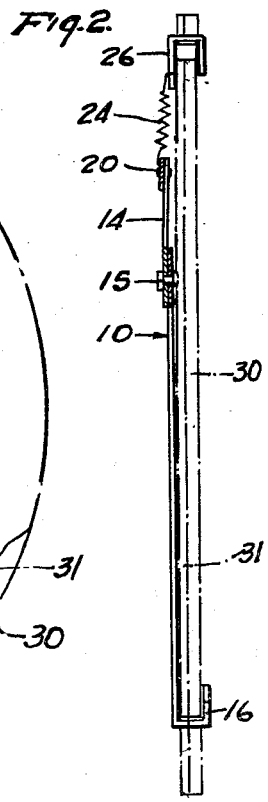
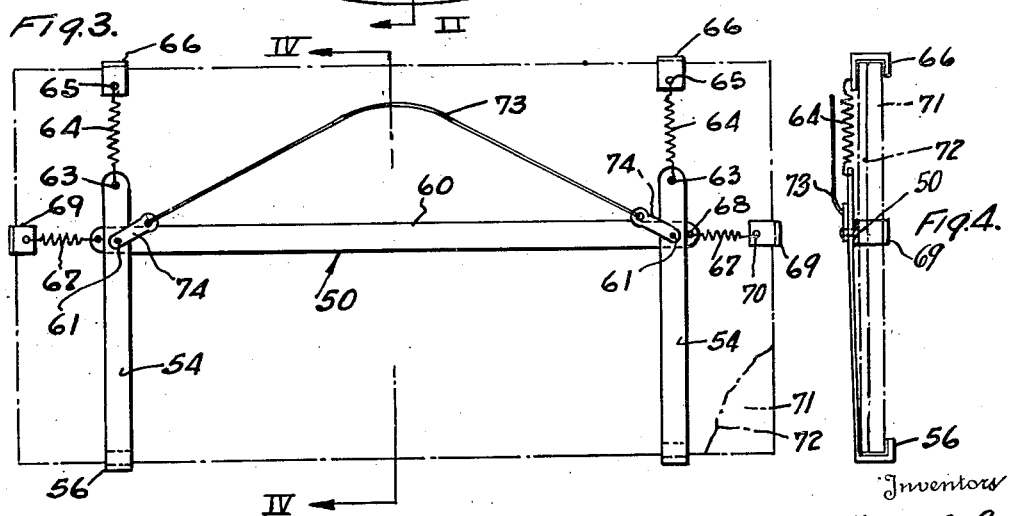

2,448,077

UNITED STATES PATENT OFFICE 2,448,077

MIRROR HANGER

Tony P. Brooks and Ben K. Wyatt, Little Rock, Ark., assignors to Pittsburgh Plate Glass Company, Allegheny County, Pa., a corporation of Pennsylvania Application May 9, 1946, Serial No. 668,382

2 Claims. (Cl. 248—29)

This invention relates to hangers for mirrors and it has particular relation to a type of mirror hanger which also holds a backing for the mirror in place and does not require piercing of the mirror or backing to accommodate fasteners from which the mirror is to be suspended.

One object of the invention is to provide a detachable hanger which can be sprung into and out of place upon a mirror and at the same time maintains a backing properly held in aligned position upon the mirror.

Another object of the invention is to provide an improved mirror hanger of frame construction capable of hanging mirrors of various sizes without mechanical adjustment of the parts thereof.

The invention is exemplified in a frame structure and resiliently connected elements which facilitate its mounting upon a mirror and in which suspension elements of the structure are positive in supporting the mirror while other portions are yieldable or resilient and can be sprung so as to impose gripping action upon the mirror. The structure is also expansible to such extent that it can be applied to mirrors of various sizes within limits of considerable magnitude. The principles of the invention can be applied to mirrors of circular or oval form and to polygonal mirrors.

In the drawing:

Fig. 1 is a rear elevation of a hanger as applied to a circular mirror; Fig. 2 is a vertical section taken substantially along the line II—II of Fig. 1; Fig. 3 is a rear elevation of a hanger as applied to a polygonal mirror; and Fig. 4 is a vertical section taken substantially along the line IV-IV of Fig. 3.

Referring to Figures 1 and 2, a mirror hanger 10 constructed according to the invention includes a pair of metal straps 14 in which are crossed and secured together intermediate their ends by means of a fastener 15. The lower ends of the straps are reversely bent to form hooks 16 and the other ends are traversed by a cross strap 20 which is secured thereto by means of fasteners 21. The ends of the cross strap extend in opposite directions and laterally beyond the ends of the upright straps 14 and are formed with openings 23 at their end portions. Tension springs 24 have their inner ends connected to the cross strap in the openings 23 and have their outer ends connected in openings 25 that are formed in relatively short hooks 26. In hanging a mirror, such as the mirror 30, it is customary to apply thereto a backing 31 of fiber board of the type known as "Masonite." By hooking the lower hooks 16 about the lower edges of the mirror and its backing, and then springing the hooks 26 against the tension of the springs 24 over the opposite upper edge portions of the mirror and backing, these elements are held firmly in place under the influence of the springs 24. A notch 34 is formed in the cross strap 20 by which the mirror is hung upon a nail or pin in a wall. In this manner the mirror is positively suspended upon the strap portions of the hanger with the weight of the mirror carried in the lower hooks 16. The springs thus serve only to hold the hanger firmly in sprung relation upon the mirror and do not carry an appreciable part of the mirror weight.

Referring to Figures 3 and 4, a mirror hanger 50 constructed according to an alternate form of the invention includes a pair of metal straps 54 which are disposed in upright substantially parallel relation. The lower ends of the straps are reversely bent to form hooks 56 and the other end portions are traversed by a cross strap 60 which is secured thereto by means of fasteners 61. The upper ends of the upright strap 54 extend upwardly beyond the end portions of the cross strap 60 and are formed with openings 63 at their end portions. Tension springs 64 have their inner ends connected to the ends of the upright straps 54 in the openings 63 and have their outer or upper ends connected in openings 65 that are formed in relatively short hooks 66.

In like manner, tension springs 67 have their inner ends connected to the ends of the cross strap 60 in openings 68 and have their outer ends connected to relatively short hooks 69 that have openings 70 formed therein to receive the springs.

In the arrangements shown in Figures 3 and 4, as in the other arrangement described, it is customary in hanging mirrors, such as the mirror 71 to apply a backing 72 of fiber board such as that known as "Masonite."

By hooking the lower hooks 56 about the lower edges of the mirror and its backing and then springing the hooks 66 and 69 over the upper and side edge portions of the mirror and backing, these elements are held firmly in place under the influence of the tension springs 64 and 67. A cable or cord 73 is connected to I-bars 74 which are connected to the straps by means of the fasteners 61.

In this manner the mirror can be positively suspended upon the strap portions of the hanger with the weight of the mirror carried in the lower hooks 56. The springs thus serve primarily to hold the hanger firmly in sprung relation upon the mirror, while the weight of the mirror is positively carried by the straps.

Although illustrative forms of the invention have been shown and described in detail, it will be apparent to those skilled in the art that the invention is not so limited but that various changes can be made therein without departing from the spirit of the invention or from the scope thereof as exemplified in the accompanying claims.

We claim:

1. A mirror hanger comprising upright intersecting strap elements connected together at their intersecting area and defining an upper suspending frame area, means connected to the suspending frame area to suspend the mirror hanger, the lower end portions of the strap elements extending from one side of said intersecting area having hooks formed thereon for engaging the lower edge portions of a mirror, the end portions of the strap elements at the other side of the intersecting area having resilient tension members mounted thereon, and hooks on the outer end portions of the resilient members for engaging upper edge portions of the mirror, said strap elements including the frame area and said means being substantially inextensible from said means to the hooks at the lower end portions of said strap elements.

2. A mirror hanger comprising upright straps, a cross strap connected transversely to the upright straps forming therewith a frame structure and defining an upper suspending frame area, means connected to the suspending frame area to suspend the mirror holding frame structure, hook portions at the lower ends of the upright straps for receiving lower edges of a mirror, resilient members connected to the upper portions of the frame structure, and hooks connected to the outer ends of the resilient members for gripping upper edges of the mirror under tension exerted by the resilient members, said means and straps being substantially inextensible from said means to the hooks on the lower portions on said upright straps.

TONY P. BROOKS.
BEN K. WYATT.

REFERENCES CITED

The following references are of record in the file of this patent:

UNITED STATES PATENTS

| Number | Name | Date |
|---|---|---|
| 652,976 | Norton | July 3, 1900 |
| 887,744 | Timberlake | May 12, 1908 |
| 897,969 | Faris | Sept. 8, 1908 |
| 1,056,636 | Davison | Mar. 18, 1913 |